United States Patent [19]

Magee

[11] 3,899,318

[45] Aug. 12, 1975

[54] HERBICIDAL 1,5-DITHIA-2,4,6,8-TETRAZACYCLOOCTANE-3,7-DIONE

[75] Inventor: Philip S. Magee, Ignacio, Calif.

[73] Assignee: Chevron Research Company, San Francisco, Calif.

[22] Filed: Sept. 30, 1974

[21] Appl. No.: 510,272

Related U.S. Application Data

[62] Division of Ser. No. 341,005, March 14, 1973, Pat. No. 3,853,853.

[52] U.S. Cl. .................................................. 71/90
[51] Int. Cl.² .......................................... A01n 9/14
[58] Field of Search ........................................ 71/90

Primary Examiner—Elbert L. Roberts
Assistant Examiner—Catherine L. Mills
Attorney, Agent, or Firm—J. A. Buchanan, Jr.; John Stoner, Jr.; Raymond Owyang

[57] ABSTRACT

Novel 1,5-dithia-2,4,6,8-tetrazacyclooctane-3,7-diones, useful as herbicides, are prepared by cyclodimerizing an N-chlorothiourea compound in the presence of an organic nitrogen base having no free hydrogen atoms, e.g., a tertiary organic amine or a pyridine compound.

12 Claims, No Drawings

HERBICIDAL 1,5-DITHIA-2,4,6,8-TETRAZACYCLOOCTANE-3,7-DIONE

This is a division of application Ser. No. 341,005, filed Mar. 14, 1973, now Pat. No. 3,853,853.

DESCRIPTION OF THE PRIOR ART

French Patent 39,284, granted May 29, 1972, discloses the reaction of urea compounds and sulfur dichloride to produce acyclic dimeric bis-urea sulfides. U.S. Ser. Nos. 250,895 of Cleveland and 250,907 of Kohn et al., both filed May 5, 1972, disclose the reaction of N-chlorothio urea compounds and sodium iodide to produce acyclic dimeric bis-urea disulfides.

SUMMARY OF THE INVENTION

It has now been found that an N-chlorothio urea compound wherein the N'-nitrogen atom of the urea compound has at least one hydrogen substituent can be cyclodimerized in the presence of a tertiary organic nitrogen base, i.e., an organic nitrogen base having no hydrogen substituted on the nitrogen atom, to produce a 1,5-dithia-2,4,6,8-tetrazacyclooctane-3,7-dione compound.

DESCRIPTION OF THE INVENTION

The N-Chlorothio Urea Reactant

In general, any N-chlorothio urea compound having an N-chlorothio substituent on one urea nitrogen atom and a hydrogen substituent on the other urea nitrogen atom is suitably employed for preparing the 1,5-dithia-2,4,6,8-tetrazacyclooctane-3,7-dione compounds of the invention. A class of suitable N-chlorothio urea reactants may be represented by the following formula (I)

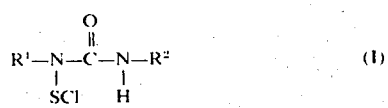

wherein $R^1$ and $R^2$ individually are hydrogen, lower alkyl of 1 to 6 carbon atoms, cycloalkyl of 5 to 8 carbon atoms, hydrocarbyl aryl of 6 to 10 carbon atoms or aryl of 6 to 10 carbon atoms substituted with 1 to 4 fluorine, chlorine, bromine, trichloromethyl, trifluoromethyl, alkoxy of 1 to 4 carbon atoms or nitro groups.

Representative alkyl groups which $R^1$ and $R^2$ may represent include methyl, ethyl, n-propyl, ispropyl, n-butyl, t-butyl, n-pentyl and n-hexyl. The preferred alkyl group is methyl.

Representative cycloalkyl groups which $R^1$ and $R^2$ may represent include cyclopentyl, cyclohexyl, 2-methylcyclohexyl, 4-methylcyclohexyl, cycloheptyl and cyclooctyl.

Representative hydrocarbyl aryl groups which $R^1$ and $R^2$ may represent include phenyl; naphthyl; alkaryl of 7 to 10 carbon atoms, such as 2-methylphenyl, 3-methylphenyl, 4-ethylphenyl, 2,4-dimethylphenyl, 3,4-dimethylphenyl, 3-sec-butylphenyl; and aralkyl of 7 to 10 carbon atoms, such as benzyl, 3-phenylpropyl, and 4-phenylbutyl.

Representative substituted aryl groups which $R^1$ and $R^2$ may represent include halo-substituted aryl groups such as 2-fluorophenyl, 4-fluorophenyl, 2-chlorophenyl, 3-chlorophenyl, 3,4-dichlorophenyl, 4-trifluoromethylphenyl, 3-chloro-4-bromophenyl, 2-chloro-4-methylphenyl, 2-fluoro-4-methylphenyl, 4-chlorobenzyl, 4-fluorobenzyl, 2-(2-fluorophenyl)ethyl; alkoxysubstituted aryl groups such as 4-methoxyphenyl, 4-ethoxyphenyl, 4-methoxy-2-methylphenyl, 4-methoxybenzyl; nitro-substituted aryl groups such as 2-nitrophenyl, 4-nitrophenyl and 4-nitrobenzyl; and aryl groups substituted with different substituents such as 2-methoxy-4-chlorophenyl and 2-chloro-4-nitrophenyl. Substituted aryl groups preferably have 1 to 2 substituents. Preferred substituted aryl groups are halo-substituted phenyls, especially those having 1 to 2 fluorine or chlorine substituents.

Preferably $R^1$ is alkyl of 1 to 2 carbon atoms, especially methyl.

Preferably $R^2$ is phenyl or phenyl substituted with 1 to 2 halogens of atomic number 9 to 35 (fluorine or chlorine), trifluoromethyl groups, nitro groups, alkyl of 1 to 2 carbon atoms, or alkoxy of 1 to 2 carbon atoms.

The N-chlorothio ureas are prepared by sulfenylation of a urea compound in accordance with the following equation (1):

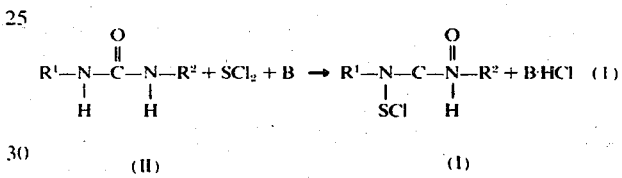

wherein $R^1$ and $R^2$ have the same significance as previously defined and B is an acid acceptor.

The acid acceptor is an organic base such as a pyridine compound or a trialkylamine compound. Suitable pyridine compounds are pyridine and pyridine compounds of 6 to 10 carbon atoms and of 1 to 2 alkyl groups such as 2-methylpyridine, 2-ethylpyridine, 3-methylpyridine, 3,5-dimethylpyridine, and 2-butylpyridine. Suitable trialkylamines are those wherein the alkyl group contains individually 1 to 4 carbon atoms, such as trimethylamine, triethylamine, tripropylamine and tributylamine.

Generally, sulfur dichloride of reasonable purity, e.g., greater than 98% purity, is employed. The sulfur dichloride preferably contains small amounts of an inhibitor such as tributylphosphate or triethylphosphate and is freshly distilled before use.

The sulfur dichloride and the urea compound (II) are employed in substantially equimolar amounts, e.g., the molar ratio of sulfur dichloride to the urea compound (II) generally varies from about 1.5:1 to 1:1.5, although molar ratios of sulfur dichloride to the urea compound of 1.2:1 to 1:1 are preferred. The molar ratio of acid acceptor to sulfur dichloride is also substantially equimolar, e.g., the molar ratio of acid acceptor to sulfur dichloride varies from about 1.2:1 to 1:1.2, although molar ratios of acid acceptor to sulfur dichloride of 1:1 to 1:1.2 are preferred.

In general, the reaction is accomplished by reacting the urea (II) and the sulfur dichloride in the presence of the acid acceptor compound in an inert diluent. The reaction is suitably conducted by adding the sulfur dichloride to a mixture of the urea and the acid acceptor in an inert diluent. Alternatively, the reaction is conducted by adding a mixture of the urea and acid acceptor to a solution of the sulfur dichloride in an inert diluent. However, the preferred method for conducting the reaction comprises reacting the urea and sulfur dichloride in the presence of a limited amount of free, uncomplexed acid acceptor. This is suitably accomplished by the addition of the acid acceptor to a substantially equimolar mixture of the urea and the sulfur dichloride so that the mols of free acid acceptor to the total mols of urea reactant and N-chlorothio urea product is less than 0.2:1, preferably less than 0.1:1, and more preferably less than 0.05:1. In other words, during the course of the reaction between the sulfur dichloride and the urea reactant, there should be at least 5 mols of the urea reactant and the N-chlorothio urea product per mol of acid acceptor which is not complexed with hydrochloric acid. Provided that the reaction is conducted with the restricted amount of acid acceptor indicated above, the contacting of the acid acceptor with the mixture of the urea and the sulfur dichloride can be conducted by a variety of procedures. In one modification, the acid acceptor is added in increments, e.g., dropwise, in an inert diluent; if desired, to a mixture of the urea and sulfur dichloride in an inert diluent. In another modification, the acid acceptor is added continuously to a mixture of the urea and sulfur dichloride in an inert diluent.

Suitable inert diluents for the reaction include alkanes of 5 to 10 carbon atoms, such as hexane, isooctane and decane; aromatic compounds such as benzene and chlorobenzene; oxygenated hydrocarbons such as acyclic alkyl ethers, e.g., dimethoxyethane and dibutyl ether; and cycloalkyl ethers, e.g., dioxane, tetrahydrofuran and tetrahydropyran. Other suitable diluents include nitriles such as acetonitrile and propionitrile. Preferred diluents are chlorinated hydrocarbons of 1 to 2 carbon atoms, such as methylene dichloride, chloroform, carbon tetrachloride and ethylene dichloride. Generally, the amount of diluent employed ranges from 1 to 50 mols per mol of sulfur dichloride.

The reaction is suitably conducted at a temperature between −20°C. and the boiling point of the diluent, although temperatures between 0°C. and 50°C. are preferred. The reaction is conducted at or above atmospheric pressure.

The N-chlorothio urea may be isolated by conventional procedures, e.g., filtration, extraction, distillation, chromatography, etc. However, it is generally preferred to filter the hydrochloride salt of the organic base formed during the reaction and to employ, without further purification, the resulting solution of the N-chlorothio urea in the inert diluent in the preparation of the 1,5-dithia-2,4,6,8-tetrazacyclooctane-3,7-dione compounds of the invention.

It is appreciated, of course, that the N-chlorothio urea (I) is formed by the substitution of a hydrogen substituent on a urea nitrogen atom by a sulfenyl chloride group. Since the urea (II) has more than one hydrogen substituted on a urea nitrogen, a mixture of monochlorothio derivatives is therefore generally formed [unless the urea (II) is symmetrical, i.e., R$^1$ is the same as R$^2$]. However, when one R$^1$ or R$^2$ group is alkyl and the other aryl, the urea (II) is preferentially sulfenylated at the nitrogen atom bearing the alkyl group.

The 1,5-Dithia-2,4,6,8-Tetrazacyclooctane-3,7-Dione Product

The compounds of the invention are prepared from the N-chlorothio urea reactants represented by formula (I) and a tertiary organic nitrogen base according to the following equation (2)

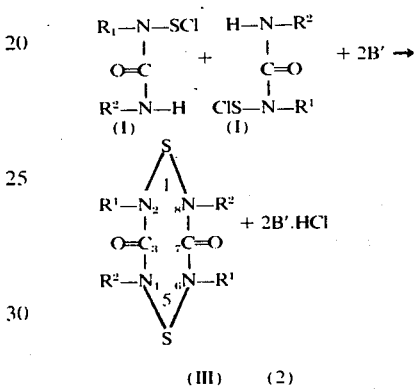

wherein R$^1$ and R$^2$ have the same significance as defined above and B' is an organic nitrogen base as defined below.

As depicted in equation (2), the reaction of a single N-chlorothio urea reactant with the organic nitrogen base produces a single symmetrical 1,5-dithia-2,4,6,8-tetrazocyclooctane-3,7-dione product. By way of illustration:

1. the reaction of N-chlorothio urea and an organic nitrogen base, e.g., pyridine, produces 1,5-dithia-2,4,6,8-tetrazacyclooctane-3,7-dione;

2. the reaction of N-chlorothio-N-methyl urea and an organic nitrogen base produces 1,5-dithia-2,6-dimethyl-2,4,6,8-tetrazacyclooctane-3,7-dione; and 3. the reaction of N-chlorothio-N'-phenyl urea and an organic nitrogen base produces 1,5-dithia-2,6-diphenyl-2,4,6,8-tetrazacyclooctane-3,7-dione.

The reaction depicted in equation (2) may also be conducted with two different N-chlorothio urea reactants. As depicted below in equation (3), the use of two different N-chlorothio ureas generally produces a random mixture of 1,5-dithia-2,4,6,8-tetrazacyclooctane-3,7-dione products.

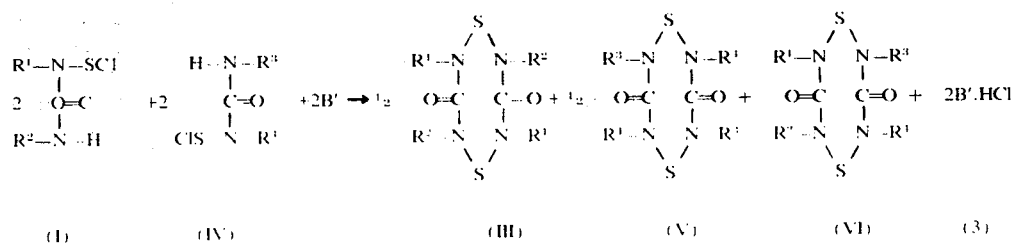

wherein $R^1$, $R^2$ and $B'$ are as defined above and $R^3$ and $R^4$ individually represent the same groups as $R^1$ and $R^2$. By way of illustration, the reaction of N-chlorothio-N-methyl-N'-phenyl urea and N-chlorothio-N-naphthyl urea according to equation (3) produces a mixture of 1,5-dithia-2,6-dimethyl-4,8-diphenyl-2,4,-6,8-tetrazacyclooctane-3,7-dione; 1,5-dithia-2,6-dinaphthyl-2,4,6,8-tetrazacyclooctane-3,7-dione; and 1,5-dithia-2-methyl-4-phenyl-6-naphthyl-2,4,6,8-tetrazcyclooctane-3,7-dione.

The tertiary organic nitrogen base employed in reactions (2) and (3) are those having no hydrogen atoms on the nitrogen atom, i.e., no N—H groups. Such organic nitrogen bases include trialkylamines wherein the alkyl groups have 1 to 10 carbon atoms, wherein two alkyl groups may be joined to form a 5- to 6-membered heterocyclic ring with the nitrogen atom, such as trimethylamine, triethylamine, tripropylamine, trihexylamine, N-methylpyrrolidine and N-methylpiperidine, and pyridine compounds of 6 to 10 carbon atoms, such as pyridine, lutidines, collidines, and 2-butylpyridine. The preferred organic nitrogen bases are pyridine compounds.

The N-chlorothio urea reactant (I) and the organic nitrogen base are generally employed in substantially equimolar amounts, e.g., the molar ratio of N-chlorothio urea to base generally varies from about 1.5:1 to 1:1.5. Preferably, however, at least one mol of base is employed per mol of N-chlorothio urea, i.e., the molar ratio of N-chlorothio urea to base is preferably 1:1 to 1:1.5.

The reaction between the N-chlorothio urea and the base is conducted in an inert diluent, e.g., the same diluent employed in the preparation of the N-chlorothio urea. Generally, the amount of diluent employed ranges from 1 to 50 mols per mol of N-chlorothio urea. The reaction is suitably conducted at a temperature between −20°C. and the boiling point of the diluent, although temperatures between 0°C. and 75°C. are preferred. The reaction is conducted at, below or above atmospheric pressure. For convenience, the reaction pressure is generally atmospheric. The 1,5-dithia-2,4,6,8-tetrazacyclooctane-3,7-dione product is isolated and purified by conventional procedures such as filtration, extraction, chromatography, or crystallization.

The preparation of representative compounds of the invention are illustrated by the following examples.

EXAMPLES

Example 1 — Preparation of
N-chlorothio-N-methyl-N'-2-fluorophenyl urea

A 5.7 g (0.055 mol) sample of sulfur dichloride was added dropwise to a mixture of 8.4 g (0.05 mol) N-methyl-N'-2-fluorophenylurea and 4.7 g (0.06 mol) pyridine in 50 ml methylene chloride cooled in an ice bath. After the completion of the addition, the pyridine hydrochloride formed during the reaction was filtered. Hexane was added to the filtrate to precipitate some additional pyridine hydrochloride, which was removed by filtration. Evaporation of the resulting filtrate gave a clear, red oil. The nuclear magnetic resonance spectrum of the oil showed an N-methyl singlet at 3.5 ppm (relative to tetramethylsilane). Elemental analysis showed:

|     | Calc. | Found |
|-----|-------|-------|
| % S | 13.6  | 13.6  |
| % Cl| 15.1  | 15.4  |

Example 2 — Preparation of
N-chlorothio-N-methyl-N'-3,4-dichlorophenyl urea

A 9.48 g (0.12 mol) sample of pyridine was added dropwise to a slurry of 21.9 (0.1 mol) N-methyl-N'-3,4-dichlorophenyl) urea and 11.3 g (0.11 mol) sulfur dichloride in 100 ml methylene dichloride at 25°–30°C. After the completion of the addition, pyridine hydrochloride was filtered from the reaction mixture. The nuclear magnetic resonance spectrum of the reaction mixture showed a singlet at 3.5 ppm (relative to tetramethylsilane) for the N-methyl group of the N-chlorothio-N-methyl-N'-3,4-dichlorophenyl urea product.

Example 3 — Preparation of
N-chlorothio-N,N'-dimethyl urea

Pyridine, 9.48 g (0.12 mol) was added dropwise to a solution of 8.8 g (0.1 mol) N,N'-dimethyl urea and 11.3 g (0.11 mol) sulfur dichloride at 25°–30°C. Pyridine hydrochloride was then filtered from the reaction mixture to give a solution of the N-chlorothio urea product in methylene chloride. The nuclear magnetic resonance spectrum of the product showed a singlet at 3.5 ppm for the N-methyl group and a doublet at 2.95 ppm for the N'-methyl group.

Example 4 — Preparation of
1,5-dithia-2,6-di(2-fluorophenyl)-
4,8-dimethyl-2,4,6,8-tetrazacyclooctane-3,7-dione A 0.15-mol sample of N-chlorothio-N-methyl-N'-2-fluorophenyl urea in 150 ml methylene dichloride and 12 g (0.15 mol) pyridine was mixed at about 25°C. and warmed to 45°C. during a 15-minute period. The reaction mixture was filtered to remove the pyridine hydrochloride salt formed during the reaction. The filtrate was evaporated under reduced pressure to give sticky, solid residue. The residue was treated with water, filtered, and dried to give 4.8 g of product as a white solid, m.p. 183°–186°C. Elemental analysis for $C_{16}H_{14}F_2N_4O_2S_2$ showed:

|     | Calc. | Found |
|-----|-------|-------|
| % F | 9.95  | 10.32 |
| % S | 16.12 | 16.22 |

Example 5 — Preparation of
1,5-dithia-2,6-di(4-chlorophenyl)-
4,8-dimethyl-2,4,6,8-tetrazacyclooctane-3,7-dione A mixture of 15 g (0.081 mol) N-methyl-N'-4-chlorophenyl urea, 8.5 g (0.083 mol) freshly distilled sulfur dichloride containing minor amounts of triethylphosphate and 6.7 g (0.083 mol) pyridine in 150 ml methylene dichloride was stirred at about 25°C. for 1 hour. To precipitate the pyridine hydrochloride salt formed during the reaction, the volume of the reaction mixture was reduced about one-third by evaporation under reduced pressure. The reaction mixture was then filtered to give a solution of N-chlorothio-N-methyl-N'-4-chlorophenyl urea.

A 6.7-g (0.83 mol) sample of pyridine was added to the above N-chlorothio urea solution. The mixture was stirred at about 25°C. for 1 hour and then at about 40°C. for one-half hour. The mixture was allowed to stand for about 2 days and then filtered. The filtrate was evaporated under reduced pressure to give the crude product. The residue of pyridine hydrochloride salt was treated with water, filtered and dried to give an additional sample of crude product. Recrystallization of the combined crude product from chloroform gave the product as a pale yellow solid, dec. 196°C. Osmometer molecular weight determination gave a value of 421 (calculated 429.35). Infrared analysis showed carbonyl absorption at 6μ and no N—H absorption. Elemental analysis for $C_{16}H_{14}Cl_2N_4O_2S_2$ showed:

|      | Calc. | Found |
|------|-------|-------|
| % Cl | 16.5  | 16.8  |
| % S  | 14.9  | 14.7  |

Example 6 — Preparation of 1,5-dithia-2,6-di(m-trifluoromethylphenyl)-4,8-dimethyl-2,4,6,8-tetrazacyclooctane-3,7-dione A mixture of 15 g (0.069 mol) N-methyl-N'-m-trifluoromethylphenyl urea, 8.1 g (0.079 mol) freshly distilled sulfur dichloride containing a minor amount of triethylphosphate and 6.3 (0.079 mol) pyridine in 100 ml methylene dichloride was stirred for 1.5 hours at about 25°C. A precipitate of pyridine hydrochloride salt was formed. The mixture was filtered and the filtered salt was washed with methylene dichloride.

To the methylene dichloride solution of N-chlorothio-N-methyl-N'-m-trifluoromethylphenyl urea, prepared above, was for one-half hour, and then at about 40°C. for one-half hour. The solution was allowed to stand at about 25°C. for about 16 hours and filtered to remove the precipitated pyridine hydrochloride salt. The filtrate was concentrated and treated with hexane to precipitate additional salt. The additional salt was filtered, and the filtrate was evaporated. The residue was slurried with water and then with methanol to give the product as a white solid, m.p. 153°–156°C. Elemental analysis for $C_{18}H_{16}F_6N_4O_2S_2$ showed:

|     | Calc. | Found |
|-----|-------|-------|
| % F | 22.9  | 25.3  |
| % S | 12.8  | 14.2  |

Example 7 — Preparation of 1,5-dithia-2,6-di(2,5-dichlorophenyl)-4,8-dimethyl-2,4,6,8-tetrazacyclooctane-3,7-dione A mixture of 15 g (0.0685 mol) N-methyl-N'-2,5-dichlorophenyl urea, 8.1 g (0.079 mol) freshly distilled sulfur dichloride containing a minor amount of triethylphosphate and 6.3 g (0.079 mol) pyridine in 100 ml methylene dichloride was stirred at about 25°C. for 1 hour. A precipitate of pyridine hydrochloride was formed. The mixture was filtered to give a solution of N-chlorothio-N-methyl-N'-2,5-dichlorophenyl urea.

To the solution of N-chlorothio-N-methyl-N'-2,5-dichlorophenyl urea, prepared above, was added 7.0 g pyridine. The solution was stirred at 25°C. for one-half hour and then at 40°–45°C. for one-half hour. Pyridine hydrochloride salt formed during the reaction. The salt was removed by filtration and the filtrate was concentrated to give a solid precipitate. The solid precipitate was recovered by filtration, washed with water and dried to give the product as a yellow solid, dec. 220°C. Elemental analysis for $C_{16}H_{12}Cl_4N_4O_2S_2$ showed:

|      | Calc. | Found |
|------|-------|-------|
| % Cl | 28.3  | 27.4  |
| % S  | 12.8  | 12.4  |

Example 8 — Preparation of 1,5-dithia-2,6-dicyclooctyl-4,8-dimethyl-2,4,6,8-tetracyclooctane-3,7-dione A mixture of 18.3 (0.1 mol) N-methyl-N'-cyclooctyl urea, 12 g (0.117 mol) freshly distilled sulfur dichloride containing a minor amount of triethylphosphate and 9.2 g pyridine was stirred at 25°C. for 1 hour. The mixture was filtered to give a solution of N-chlorothio-N-methyl-N'-cyclooctyl urea. To the N-chlorothio urea solution was added 9.2 g pyridine. The resulting reaction mixture was stirred at 25°C. for one-half hour and then at 40°–45°C. for one-half hour. The reaction mixture was filtered and the filtrate was concentrated to precipitate the crude product. The crude product was washed with water, dried and recrystallized from hexane to give the product as a yellow solid, m.p. 87°–90°C. Elemental analysis for $C_{20}H_{36}N_4O_2S_2$ showed:

|     | Calc. | Found |
|-----|-------|-------|
| % C | 56.6  | 58.2  |
| % H | 8.5   | 9.0   |
| % N | 13.1  | 13.4  |
| % S | 14.9  | 12.2  |

Example 9 — Preparation of 1,5-dithia-2,6-di(3,4-dichlorophenyl)-4,8-dimethyl-2,4,6,8-tetrazacyclooctane-3,7-dione A 10.2 g (0.1 mol) sample of freshly distilled sulfur dichloride containing a minor amount of triethylphosphate was added dropwise to a mixture of 21 g (0.1 mol) N-methyl-N'-3,4-dichlorophenyl urea and 15 g (0.2 mol) pyridine. The reaction was exothermic. The mixture was stirred until the reaction temperature dropped to about 25°C. The mixture was then warmed to 45°C. and stirred for one-half hour. The pyridine hydrochloride salt formed during the reaction was filtered. The filtrate was evaporated under reduced pressure to give a semi-solid. The semi-solid was diluted with methylene dichloride and filtered to give the product as a fine, white solid, m.p. 182°–196°C. Elemental analysis for $C_{16}H_{12}Cl_4N_4O_2S_2$ showed:

|      | Calc. | Found |
|------|-------|-------|
| % S  | 12.8  | 13.4  |
| % Cl | 28.4  | 28.4  |

The filtrate was evaporated to give a semi-solid residue. The residue was dissolved in methylene dichloride, washed with water, dried over magnesium sulfate, filtered and evaporated. The resulting residue was crystallized from ether to give yellow crystals of bis-(1-methyl-3-[3,4-dichlorophenyl]-1-ureido) sulfide, m.p. 162°–166°C.

UTILITY

The compounds of the present invention are, in general, herbicidal in both pre- and post-emergence applications. For pre-emergence control of undesirable vegetation, the herbicidal compounds will be applied in herbicidally effective amounts to the environment or growth media of the vegetation, e.g., soil infested with seeds and/or seedlings of such vegetation. Such application will inhibit the growth of or kill the seeds, germinating seeds and seedlings. For post-emergence applications, the herbicidal compounds will be applied directly to the foliage and other plant parts. Generally, the herbicidal compounds of the invention are effective against weed grasses as well as broadleaf weeds. Some may be selective with respect to the type of application and/or type of weed.

The compounds of the present invention can be used alone as herbicides. However, it is generally desirable to apply the compounds in herbicidal compositions comprising one or more of the herbicidal compounds intimately admixed with a biologically inert carrier. The carrier may be a liquid diluent or a solid, e.g., in the form of dust powder or granules. In the herbicidal composition, the active herbicidal compounds can be from about 0.01 to 95% by weight of the entire composition.

Suitable liquid diluent carriers include water and organic solvents, e.g., hydrocarbons such as benzene, toluene, kerosene, diesel oil, fuel oil, and petroleum naphtha. Suitable solid carriers are natural clays such as kaolinite, atalpulgite, and montmorillonite. In addition, talcs, pyrophillite, diatomaceous silica, synthetic fine silicas, calcium aluminosilicate and tricalcium phosphate are suitable carriers. Organic materials such as walnut-shell flour, cottonseed hulls, wheat flour, wood flour, or redwood-bark flour may also be used as a solid carrier.

The herbicidal composition will also usually contain a minor amount of surface-active agent. Such surface agents are those commonly known as wetting agents, dispersing agents and emulsifying agents, and can be anionic, cationic or non-ionic in character. The herbicidal compositions may also contain other pesticides, adjuvants, stabilizers, conditioners, fillers, and the like.

The amount of herbicidal compound or composition administered will vary with the particular plant part or plant growth medium which is to be contacted, the general location of application — i.e., sheltered areas such as greenhouses, as compared to exposed areas such as fileds — as well as the desired type of control. Generally, for both pre- and post-emergent control, the herbicidal compounds of the invention are applied at rates of 2 to 60 kg/ha., and the preferred rate is in the range of 5 to 40 kg/ha.

Pre- and post-emergence herbicidal tests on representative compounds of the invention were made using the following methods.

Pre-Emergence Test

An acetone solution of the test compound was prepared by mixing 750 mg of the compound, 220 mg of a nonionic surfactant and 25 ml of acetone. This solution was added to approximately 125 ml of water containing 156 mg of surfactant.

Seeds of the test vegetation were planted in a pot of soil and the urea solution was sprayed uniformly onto the soil surface at a dose of 33 $\mu$/cm$^2$. The pot was watered and placed in a greenhouse. The pot was watered intermittently and was observed for seedling emergence, health of emerging seedlings, etc., for a 3-week period. At the end of this period the herbicidal effectiveness of the compound was rated based on the physiological observations. A 0-to-100 scale was used, 0 representing no phytoxicity, 100 representing complete kill.

Post-Emergence Test

The test compound was formulated in the same manner as described above for the pre-emergence test. The concentration of the test compound in this formulation was 5000 ppm. This formulation was uniformly sprayed on 2 similar pots of 24-day-old plants (approximately 15 to 25 plants per pot) at a dose of 33 $\mu$/cm$^2$. After the plants had dried, they were placed in a greenhouse and then watered intermittently at their bases, as needed. The plants were observed periodically for phytotoxic effects and physiological and morphological responses to the treatment. After 3 weeks, the herbicidal effectiveness of the compound was rated based on these observations. A 0-to-100 scale was used, 0 representing no phytotoxicity and 100 representing complete kill.

The results of these tests appear in Table I. In the Table, the following abbreviations are employed:

O = Wild Oats (*Avena fatua*)
W = Watergrass (*Echinochloa crusgalli*)
C = Crabgrass (*Digitaria sanguinalis*)
M = Mustard (*Brassica arvensis*)
P = Pigweed (*Amaranthus retroflexus*)
L = Lambsquarter (*Chenopodium album*)

TABLE I

| Compound | Herbicidal Effectiveness Pre/Post | | | | | |
|---|---|---|---|---|---|---|
| | O | W | C | M | P | L |
| Example 4 | 100/90 | 100/90 | 100/55 | 100/100 | 100/95 | 100/100 |
| 5 | 0/0 | 0/0 | 0/0 | 0/25 | 0/0 | 0/25 |
| 6 | 30/0 | 25/0 | 45/0 | 100/70 | 90/50 | 100/65 |
| 7 | 0/0 | 0/0 | 0/0 | 0/45 | 0/40 | 0/45 |
| 8 | 60/0 | 45/0 | 55/0 | 100/10 | 100/10 | 100/10 |
| 9 | 0/50 | 0/85 | 0/50 | 0/100 | 0/100 | 0/100 |

What is claimed is:

1. An herbicidal composition comprising an herbicidally effective amount of a compound of the formula

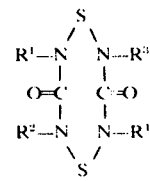

wherein $R^1$, $R^2$, $R^3$ and $R^4$ individually are hydrogen, lower alkyl of 1 to 6 carbon atoms, cycloalkyl of 5 to 8 carbon atoms, phenyl, naphthyl, alkaryl of 7 to 10 carbon atoms or aralkyl of 7 to 10 carbon atoms, each of said phenyl, naphthyl, alkaryl or aralkyl groups being unsubstituted or substituted with from 1 to 4 substituents selected from the group consisting of fluorine, chlorine, bromine, trichloromethyl, trifluoromethyl, alkoxy of 1 to 4 carbon atoms or nitro, and a biologically inert carrier.

2. The composition of claim 1 wherein $R^1$, $R^2$, $R^3$ and $R^4$ individually are lower alkyl or phenyl substituted with a trifluoromethyl group or 1 to 2 fluorine, chlorine or bromine atoms.

3. The composition of claim 1 wherein $R^1$ and $R^4$ are lower alkyl and $R^2$ and $R^3$ are phenyl substituted with 1 to 2 fluorine or chlorine atoms.

4. The composition of claim 3 wherein $R^1$ and $R^4$ are the same and $R^2$ and $R^3$ are the same.

5. The composition of claim 1 wherein the compound is 1,5-dithia-2,6-di(2-fluorophenyl)4,8-dimethyl-2,4,6,8-tetrazacyclooctane-3,7-dione.

6. A method for controlling undesirable vegetation which comprises applying thereto an herbicidally effective amount of a compound of the formula

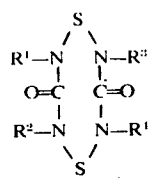

wherein $R^1$, $R^2$, $R^3$ and $R^4$ individually are hydrogen, lower alkyl of 1 to 6 carbon atoms, cycloalkyl of 5 to 8 carbon atoms, phenyl naphthyl, alkaryl of 7 to 10 carbon atoms or aralkyl of 7 to 10 carbon atoms, each of said phenyl, naphthyl, alkaryl or aralkyl groups being unsubstituted or substituted with from 1 to 4 substituents selected from the group consisting of fluorine, chlorine, bromine, trichloromethyl, trifluoromethyl, alkoxy of 1 to 4 carbon atoms or nitro.

7. The method of claim 6 wherein $R^1$, $R^2$, $R^3$ and $R^4$ individually are lower alkyl or phenyl substituted with a trifluoromethyl group or 1 to 2 fluorine, chlorine or bromine atoms.

8. The method of claim 6 wherein $R^1$ and $R^4$ are lower alkyl and $R^2$ and $R^3$ are phenyl substituted with 1 to 2 fluorine or chlorine atoms.

9. The method of claim 8 wherein $R^1$ and $R^4$ are the same and $R^2$ and $R^3$ are the same.

10. The method of claim 6 wherein the compound is 1,5-dithia-2,6-di(2-fluorophenyl)-4,8-dimethyl-2,4,6,8-tetrazacyclooctane-3,7-dione.

11. The method of claim 6 wherein the compound is applied pre-emergently.

12. The method of claim 6 wherein the compound is applied post-emergently.

* * * * *